Figure 1:
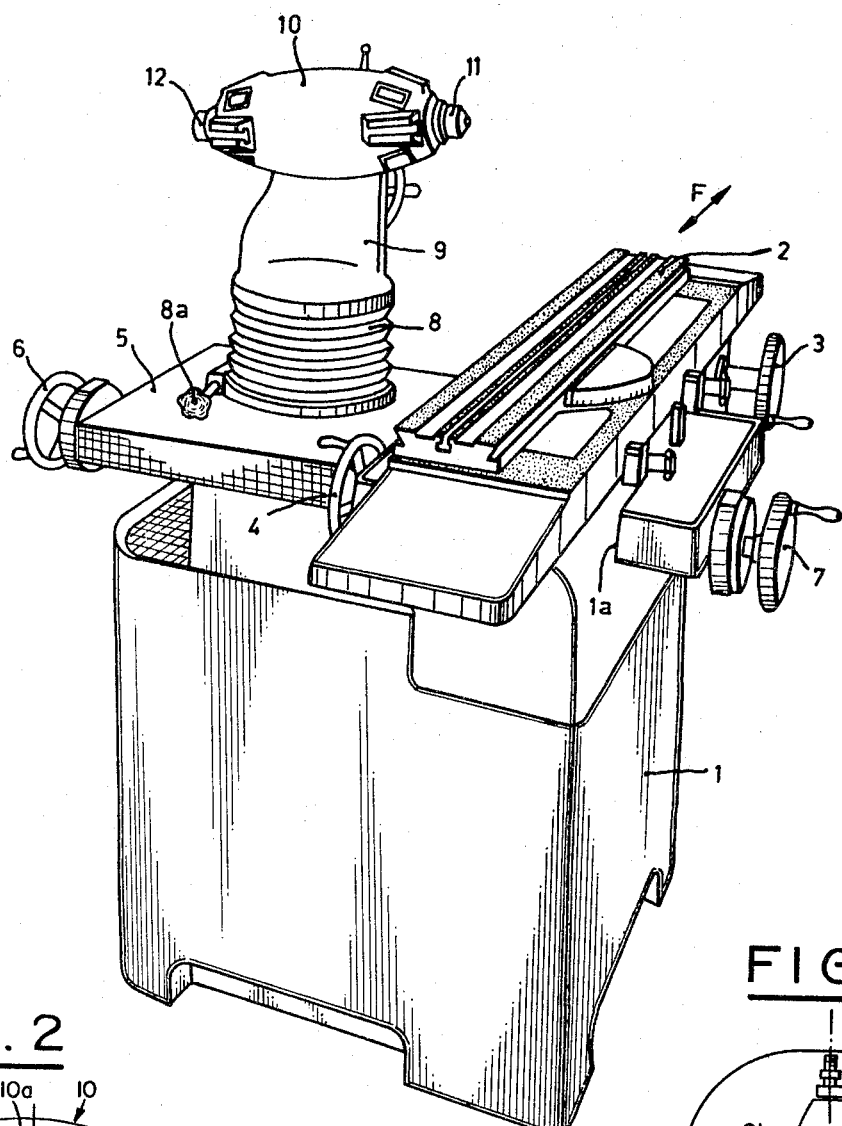

May 2, 1967   R. HABIB   3,316,613
MACHINE TOOL
Filed Aug. 7, 1964   2 Sheets-Sheet 1

May 2, 1967  R. HABIB  3,316,613
MACHINE TOOL
Filed Aug. 7, 1964  2 Sheets-Sheet 2

United States Patent Office 3,316,613
Patented May 2, 1967

3,316,613
MACHINE TOOL
Robert Habib, 36 Quai Gustave Ador,
Geneva, Switzerland
Filed Aug. 7, 1964, Ser. No. 388,170
Claims priority, application Switzerland, Aug. 9, 1963,
9,886/63
3 Claims. (Cl. 29—26)

The present invention relates to machine tools comprising a turret carrying two coaxial and opposed tool holders carried by a support rotatable horizontally on a vertical mounting.

Machines of this type are known comprising a work table horizontally movable on a slide which is itself displaceable perpendicular to the direction of the table and in which machine the mounting supporting the turret is carried on the base of the machine.

In more modern machines, the movable table and the slide are independent of one another and each of these parts moves independently with respect to the base, the turret mounting being carried by the slide.

In both the above types of machine, the dimensions as well as the path of the slide and of the table are determined by the characteristics of a particular range of workpieces to be machined. In consequence, there are machines of varying ranges according to requirements, so that a manufacturer having a machine suitable for one class of work, but occasionally requiring to machine workpieces of greater dimensions than those for which the machine is designed cannot do such work on the machine at his disposal.

The main feature of the invention consists in a machine tool comprising a turret providing two coaxial and opposed tool-holders and carried by a support which is horizontally rotatable on a pillar characterised in this that, in order to overcome said inconvenience, the support is arranged in a manner such that the turret is eccentric in relation to the axis of rotation of the support on the pillar and that the turret is rotatable in a vertical plane sufficiently to bring one or other tool-holder into the work-position at will without altering the angular position of the support on the pillar.

The accompanying drawings show, by way of example, an embodiment of the present invention.

Figure 2:
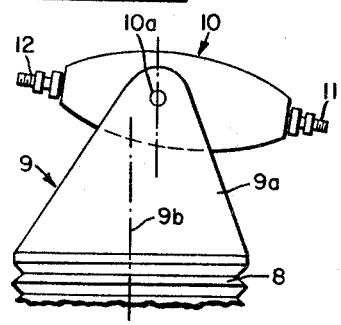
Figure 3:
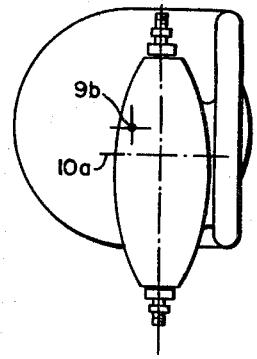
Figure 4:
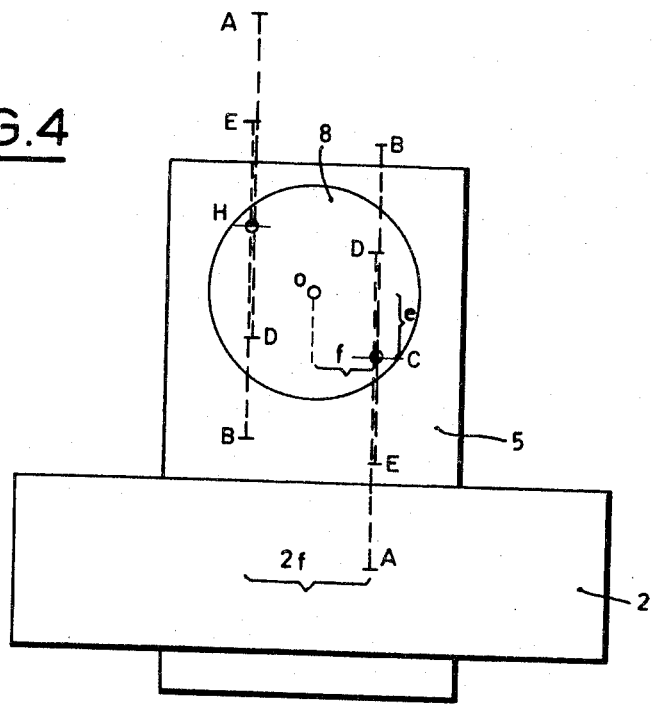
Figure 5:
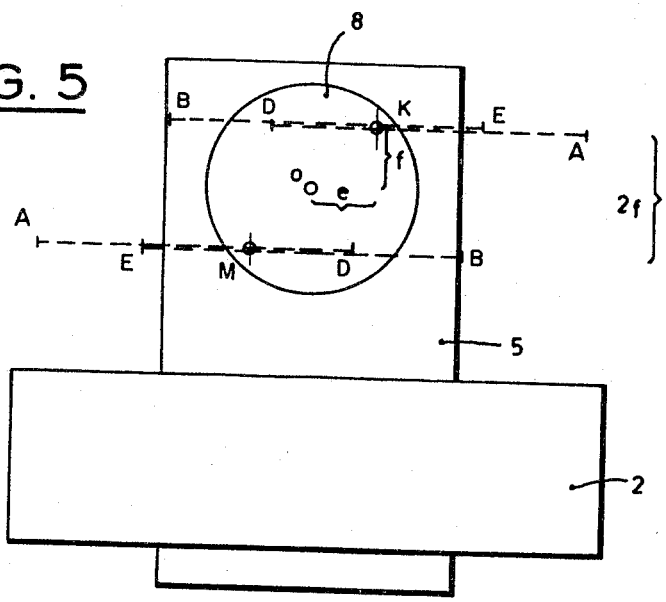

In the drawings:

FIG. 1 shows an elevation in perspective of said embodiment,

FIGS. 2 and 3 show in elevation and plan respectively, the detailed construction of the turret mounting, while FIGS. 4 and 5 illustrate, by means of schematic plan views of the essential parts of the machine, the operational possibilities offered by the turret shown in FIGS. 2 and 3.

The machine tool shown in FIG. 1 comprises a base 1 on which are mounted a work-table 2 movable in the direction F indicated in the drawing under control of feed handles 3 and 4, and a cross-slide 5 which is movable at right angles to table 2 in an extension 1a of the base, under control of a micrometer device (not shown) operable by handles 6 and 7.

A pillar 8 is mounted on the slide 5 and is vertically adjustable thereon by means not shown. The pillar 8 is locked in adjusted position by a locking lever 8a. Rotatably mounted on a vertical axis on the top of the pillar 8 is a support 9 for a slender turret 10 presenting two coaxial and opposed tool-holders 11, 12.

The tool-holders are driven by an electric motor (not shown) mounted within the turret, the rotational speed of which can be varied by modifying the coupling of its stator windings and/or the frequency of the operating current. These windings are of the "Dahlander" type by the commutation of which it is possible to arrange that the inductor can present two poles or four poles, the frequency variation being obtained by means of a generator (not shown), mounted within the base 1 of the machine and arranged to generate current at 50, 75, or 100 cycles per second. The stators associated with Dahlander windings have windings which permit changing the number of poles in order to obtain two speeds, in the ratio of 1 and 2.

It is thus possible to operate the tool-holder driving motor at speeds of 1500, 2250, 3000, 4500, and 6000 revolutions per minute by combining in known manner all possible variations of the number of stator poles and of the frequency of its operating current.

As represented in FIGS. 2 and 3, the pivotal axis 10a of the turret 10 on the support 9 is positioned so as to divide the turret into two parts of different lengths. Further, the arm 9a of the support 9 is arranged in a manner such that the pivotal axis 10a does not cut the pivotal axis 9b of the support on the pillar 8 and is on the contrary eccentric with respect thereto by a distance e, FIG. 4. Similarly, the axis of the tool-holders 11, 12 is spaced from the axis 9b by a distance f.

Finally it is pointed out that the axis 10a is sufficiently spaced from the foot of the support 9 to allow of passage of the shorter part of the turret 10 (in the drawing that part carrying the tool holder 12) above its foot, without fouling the support during a rotation of the turret in the vertical plane: in the exemplary machine shown in the drawing, the turret can be rotated through about 250° without its longer part fouling the foot of the support.

In an alternative design, not shown, the arm 9a of the support 9 could be high enough to allow of complete rotation of the turret, that is to say through 360°.

FIGS. 4 and 5 show schematically some possible ways of operating the machine described above. These figures again show the table 2, the slide 3, and the pillar 8 as well as the turret 10 which is indicated by means of the axis of the tool-holders 11, 12 which is shown in the horizontal position. In FIG. 4, the longer portion of the turret is that between the reference letters AC; or BC when the turret has been rotated through 180° around the axis 10a as described above, the shorter part of the turret being indicated by the part DC; or EC after rotation. Point C is spaced from the axis O of pillar 8 by a distance e in the direction of the axis AD, and by a distance f in the direction perpendicular to the axis AD. H shows the position of the point C after rotation of the support 9 on the pillar 8 through 180°.

It is possible to increase the range of the machine in the direction of displacement of the slide 5 by a distance corresponding to CA-CD which is equivalent to a notional increase corresponding to the stroke of the slide. Equally, it will be seen that 180° rotation of the support 9 on the pillar 8 (position H of the pivotal axis 10a, FIG. 1, of the turret), it is further possible to increase the range of the machine in the direction of movement of the table 2 at right angles to the previously-discussed direction of increase of range, by a distance equal to double the eccentricity f.

In FIG. 5, K shows the position of the axis of rotation of the turret A-D after counter-clockwise rotation of the support 9 by 90° from its position when the turret axis of rotation was at C, FIG. 4. Point M indicates the position of the turret axis of rotation after a further 180° rotation of the support 9 in the same direction.

By positioning the turret 10 parallel to the axis of table 2 (axis position M) and rotating the turret through 180°, it is possible as before to increase the range of slide 2 by a distance 2×MB corresponding to the distance separating the end A of the turret in one predetermined position and the position B of the same end after 180° rotation of the turret in the vertical plane. The increase in the range of the machine parallel to the axis of movement of the slide 5 will, as stated previously, be equal to $2f$.

It will be obvious that increases in range, similar to those described above, can be obtained when the turret is not horizontal but inclined at a predetermined angle, or when the turret is neither parallel to, nor at right angles to, the table 2.

What I claim is:

1. In a machine tool, a base and a work-table movably mounted thereon, a vertically adjustable pillar on said base, a support mounted on a vertical pivotal axis on said pillar, said support having an arm and a foot, a turret adapted to hold therein a motor for driving two coaxial and opposed tool holders, said turret being rotatable in a vertical plane to bring one or the other of said tool-holders into work position without altering the angular position of said support on said pillar, said turret being pivoted on said arm of said support so that the horizontal pivotal axis of said turret on said arm of said support divides said turret into a longer and a shorter part, said horizontal pivotal axis of said turret on said arm not intersecting said vertical pivotal axis of said support on said pillar, being eccentric with respect thereto and spaced from the axis of said tool-holders, said horizontal pivotal axis being sufficiently spaced from said foot and said support to allow passage of at least said shorter part of said turret above said foot.

2. Machine tool according to claim 1, having a cross-slide movably mounted perpendicularly to said work-table, said pillar being mounted on said slide.

3. Machine tool according to claim 1, wherein said turret is pivotable by an angle of at least 250° around said horizontal pivotal axis.

References Cited by the Examiner

UNITED STATES PATENTS 2,341,061    2/1944    Rhodes _____ 29—27.3

FOREIGN PATENTS 906,398    3/1954    Germany.

RICHARD H. EANES, Jr., *Primary Examiner.*